(12) United States Patent
Okamoto et al.

(10) Patent No.: US 7,683,167 B2
(45) Date of Patent: Mar. 23, 2010

(54) SEPARATING AGENT FOR ENANTIOMERIC ISOMERS

(75) Inventors: Yoshio Okamoto, Aichi (JP); Chiyo Yamamoto, Aichi (JP)

(73) Assignee: Daicel Chemical Industries, Ltd., Sakai-shi (JP)

( * ) Notice: Subject to any disclaimer, the term of this patent is extended or adjusted under 35 U.S.C. 154(b) by 1016 days.

(21) Appl. No.: 10/552,939

(22) PCT Filed: Apr. 22, 2004

(86) PCT No.: PCT/JP2004/005760
§ 371 (c)(1),
(2), (4) Date: Oct. 17, 2005

(87) PCT Pub. No.: WO2004/094342
PCT Pub. Date: Nov. 4, 2004

(65) Prior Publication Data
US 2007/0039890 A1 Feb. 22, 2007

(30) Foreign Application Priority Data
Apr. 24, 2003 (JP) ............................. 2003-119710

(51) Int. Cl.
*C07H 13/12* (2006.01)
*B01J 20/26* (2006.01)
(52) U.S. Cl. .................. 536/115; 502/404; 536/58; 536/107
(58) Field of Classification Search ................ 502/404; 536/115, 58, 107
See application file for complete search history.

(56) References Cited
U.S. PATENT DOCUMENTS
5,030,354 A 7/1991 Miwa et al.
5,965,026 A 10/1999 Oda et al.

FOREIGN PATENT DOCUMENTS
EP 0 747 341 A1 12/1996
JP 57-150432 9/1982
JP 63-307829 12/1988
JP 2001-124752 5/2001
JP 2002-148247 5/2002
JP 2003-277401 10/2003

OTHER PUBLICATIONS

Machine translation of JP 2001-124752, http://dossier.ipdl.inpit.go.jp/text_trans.html, accessed online on May 5, 2008.*
Acemoglu et al. "Synthesis of Regioselectively Substituted Cellulose Derivatives and Applications in Chiral Chromatography," Chirality, 1998, 10, p. 294-306.*
Okamoto et al. Bull. Chem. Soc. Jpn. 1990, 63, 955-957.*
"Preparation of mixed 10-undecenoyl/phenylaminocarbonyl or benzoyl derivatives of chitosan", by A. Senso et al, Elsevier Scientific Publishing Co., Carbohydrate Research, vol. 328, 2000, pp. 617-622.
*Useful Chiral Packing Materials for High-Performance Liquid Chromatographic Resolution of Enantiomers: Phenylcarbamates of Polysaccharides Coated on Silica Gel*, by Y. Okamoto et al, J. Am. Chem. Soc., vol. 106, No. 18, 1984, pp. 5357-5359.
*Separation of chiral compounds*, by S. Makino, Pharm. Tech. Japan, vol. 12, No. 1, 1996, pp. 43-52.

* cited by examiner

*Primary Examiner*—Shaojia Anna Jiang
*Assistant Examiner*—Jonathan S Lau
(74) *Attorney, Agent, or Firm*—Flynn, Thiel, Boutell & Tanis, P.C.

(57) ABSTRACT

The present invention provides a separating agent for enantiomeric isomers exhibiting high separation power. That is, the present invention provides a separating agent for enantiomeric isomers including, as an active ingredient, a polysaccharide derivative having at least part of hydrogen atoms of hydroxyl groups of a polysaccharide such as cellulose or amylose substituted by at least one of atomic groups represented by the following general formulae (I) and (II):

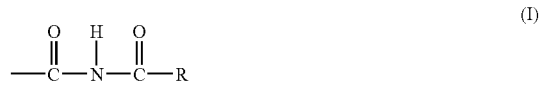
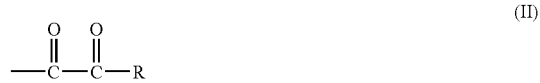

(in the formulae, R represents a substituted or unsubstituted aromatic group, or a linear, branched, or cyclic aliphatic group).

11 Claims, No Drawings

SEPARATING AGENT FOR ENANTIOMERIC ISOMERS

TECHNICAL FIELD TO WHICH THE INVENTION BELONGS

The present invention relates to a separating agent for enantiomeric isomers which is suitable for the separation of enantiomeric isomers through a method of separating compounds, in particular, a chromatography method.

PRIOR ARTS

Enantiomeric isomers having a relationship of a real image and a mirror image have exactly the same chemical properties and physical properties, including boiling point, melting point and solubility. However, there are many cases where enantiomeric isomers have differences in interaction with a living body, that is, in physiological activities such as taste and smell. In particular, in a pharmaceutical field, cases where enantiomeric isomers have significant differences in medicinal efficacy and toxicity are expected at high probability. Thus, "Drug Approval and Licensing Procedures in Japan" of Ministry of Health, Labour and Welfare includes the description "in a case where the drug is a racemic modification, it is desirable that the absorption, distribution, metabolism, and excretion behaviors of each isomer be studied in advance".

As described above, the enantiomeric isomers have exactly the same chemical properties and physical properties, including boiling point, melting point and solubility, and thus have a crucial problem in that the enantiomeric isomers cannot be analyzed by classical and usual separation means.

Thus, research on techniques for simple and highly accurate analysis of a wide variety of enantiomeric isomers have been conducted energetically.

As an analysis technique satisfying such a need, an optical resolution method by high-performance liquid chromatography (HPLC), in particular, an optical resolution method by using an enantiomeric isomer separation column for HPLC has been developed. In the "enantiomeric isomer separation column" as used herein, an asymmetry identifying agent itself is used or a chiral stationary phase having an asymmetry identifying agent carried on an appropriate carrier is used. Examples of the asymmetry identifying agent include: optically active triphenylmethyl polymethacrylate (see JP-A-57-150432); cellulose and amylose derivatives (Y. Okamoto, M. Kawashima, and K. Hatada, J. Am. Chem. Soc., 106, 5337, 1984); and ovomucoid which is a protein (JP-A-63-307829).

Of numerous chiral stationary phases for HPLC, an optical resolution column having cellulose and amylose derivatives carried on silica gel is known to exhibit high asymmetry identifying power for a very wide variety of compounds.

Studies on preparative liquid chromatography of optically active substances at an industrial level, in which a chiral stationary phase for HPLC and a simulated moving bed method are combined, have progressed (Pharm Tech Japan 12, 43). Further, a chiral stationary phase capable of efficiently separating compounds to be separated, that is, a chiral stationary phase having an even larger separation factor ($\alpha$ value) is required not only for simple and complete separation but also for improvement in productivity of preparative chromatography. Thus, research on finding a polysaccharide derivative having a large $\alpha$ value and exhibiting a high asymmetry identifying power have been conducted energetically.

DISCLOSURE OF THE INVENTION

It is an object of the present invention to provide a separating agent for enantiomeric isomers which is suitable for a chiral stationary phase used in chromatography or the like and which contains, as an active ingredient, a polysaccharide derivative having a large $\alpha$ value and exhibiting a high asymmetry identifying power.

Conventionally, a cellulose derivative or an amylose derivative, in particular, a phenyl carbamate derivative has been known to serve as a chiral stationary phase which exhibits a high optical resolving power. Of those, a substance having a hydrogen atom of a phenyl group substituted by an alkyl group or a halogen group has been known to exhibit a high optical resolving power.

A substance having a methylene group between the carbamate group and the phenyl group is known to exhibit a significantly reduced optical resolving power and a substance having a hydrogen atom of the methylene group substituted by a methyl group is known to exhibit a high optical resolving power. Further, a substance having an excessively bulky group introduced into the portion of the methylene group is found to actually exhibit a reduced optical resolving power.

The inventors of the present invention have pursued researches based on the above findings, and have found that a polysaccharide derivative having an even larger $\alpha$ value can be obtained by introducing a carbonyl group between the carbamate group and the phenyl group, thereby completing the present invention.

As means for achieving the object, the present invention provides a separating agent for enantiomeric isomers including, as an active ingredient, a polysaccharide derivative having at least part of the hydrogen atoms of the hydroxyl groups of a polysaccharide substituted by at least one of the atomic groups represented by the following general formulae (I) and (II):

(I)

(II)

(in the formulae, R represents a substituted or unsubstituted aromatic group, or a linear, branched, or cyclic aliphatic group).

The present invention relates to a use of the above-described polysaccharide derivative as a separating agent for enantiomeric isomers.

The present invention relates to a method of separating enantiomeric isomers by bringing the above-described polysaccharide derivative into contact with the enantiomeric isomers.

DETAILED DESCRIPTION OF THE INVENTION

A polysaccharide derivative used in a separating agent for enantiomeric isomers of the present invention has at least part of the hydrogen atoms of the hydroxyl groups of a polysaccharide substituted by at least one of the atomic groups represented by the general formulae (I) and (II).

The polysaccharide may be any of a synthetic polysaccharide, a natural polysaccharide, or a modified natural polysaccharide as long as the polysaccharide is optically active. However, the polysaccharide preferably has a highly regulated bonding pattern.

Examples of the polysaccharide include: β-1,4-glucan (cellulose); α-1,4-glucan (amylose or amylopectin); α-1,6-glucan (dextran); β-1,6-glucan (pustulan); β-1,3-glucan (such as curdlan or schizophyllan); α-1,3-glucan; α-1,2-glucan (Crown Gall polysaccharide); β-1,4-galactan; β-1,4-mannan; α-1,6-mannan; β-1,2-fructan (inulin); β-2,6-fructan (levan); β-1,4-xylan; β-1,3-xylan; β-1,4-chitosan; α-1,4-N-acetylchitosan (chitin); pullulan; agarose; alginic acid; and starch-containing amylose.

Of those, cellulose, amylose, β-1,4-xylan, β-1,4-chitosan, chitin, β-1,4-mannan, inulin, curdlan, and the like are preferable because they are easily available high purity polysaccharides. Cellulose and amylose are particularly preferable.

A number-average degree of polymerization of the polysaccharide (average number of pyranose rings or furanose rings in a molecule) is 5 or more, and preferably 10 or more. The number-average degree of polymerization thereof has no upper limit, but is desirably 1,000 or less from a viewpoint of easy handling.

The atomic groups which substitute at least part of the hydrogen atoms of the hydroxyl groups of a polysaccharide are represented by the general formulae (I) and (II), and examples thereof include the atomic groups described below.

(1) An atomic group in which R in each of the general formulae (I) and (II) represents an atomic group represented by the following general formula (III):

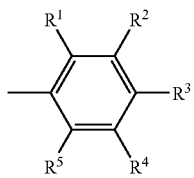

(III)

(in the formula, $R^1$ to $R^5$ may be identical to or different from each other, and $R^1$ to $R^5$ each represent an atom or group selected from hydrogen, a halogen, an alkyl group, an alkoxy group, an amino group, a nitro group, a siloxy group, and an alkylthio group).

$R^1$ to $R^5$ in the general formula (III) each preferably represent an atom or group selected from hydrogen, a halogen, and an alkyl group.

(2) An atomic group in which the atomic group represented by the general formula (I) is selected from atomic groups represented by the following formulae (IV), (V), (VI), and (VII).

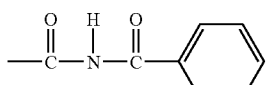

(IV)

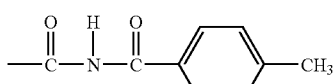

(V)

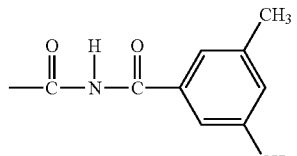

(VI)

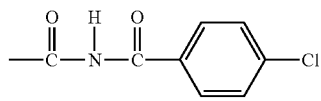

(VII)

(3) An atomic group in which R in each of the general formulae (I) and (II) is selected from atomic groups represented by the following formulae (VIII), (IX), and (X).

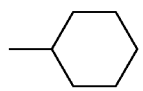

(VIII)

(IX)

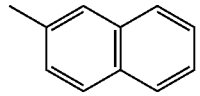

(X)

The polysaccharide derivative may be: a polysaccharide derivative having atomic groups identical to each other bonded to a polysaccharide; or a polysaccharide derivative having different atomic groups bonded to a polysaccharide. A distribution of atomic groups in the polysaccharide derivative may be even or uneven. The number of the atomic groups bonded to a monosaccharide unit of the polysaccharide derivative may be the same for all monosaccharide units or different therefor. Positions of the atomic groups bonded to the monosaccharide unit of the polysaccharide derivative may be at positions of specific hydroxyl groups in the monosaccharide unit, or the atomic groups may be bonded to the monosaccharide unit without specific regularity.

The polysaccharide derivative used in the present invention can be obtained by reacting a polysaccharide, and a compound having a functional group which may react with hydroxyl groups of the polysaccharide (a compound which may form an atomic group represented by the general formula (I) or (II)).

Examples of such a compound include: an aromatic or aliphatic carboxylic acid derivative such as an aromatic or aliphatic carboxylic acid, acid chloride, acid anhydride, or acid ester; and an aromatic or aliphatic isocyanic acid derivative.

The separating agent for enantiomeric isomers of the present invention may include: a polysaccharide derivative carried on a carrier; a pulverized polysaccharide derivative; or a polysaccharide derivative formed into spherical particles. The phrase "a polysaccharide derivative carried" as used herein indicates that a polysaccharide derivative is fixed on a carrier. Examples of a carrying method that can be used include: physical adsorption between a polysaccharide derivative and a carrier; chemical bonding between a polysaccharide derivative and a carrier; chemical bonding between polysaccharide derivatives; chemical bonding of a third component; photoirradiation to a polysaccharide derivative; and a radical reaction.

Examples of a carrier include a porous organic carrier and a porous inorganic carrier. Preferred is a porous inorganic carrier. Appropriate examples of the porous organic carrier include polymer substances such as polystyrene, polyacrylamide, and polyacrylate. Appropriate examples of the porous inorganic carrier include silica, alumina, magnesia, glass, kaolin, titanium oxide, a silicate, and hydroxyapatite.

A particularly preferable carrier is silica gel, and silica gel has a particle size of 0.1 μm to 10 μm, preferably 1 μm to 300 μm, more preferably 1 μm to 100 μm. Silica gel has an average pore size of 10 Å to 100 mm, and preferably 50 Å to 50,000 Å. Silica gel is preferably subjected to surface treatment for eliminating an effect of silanol remaining on its surface, but needs not be subjected to surface treatment at all.

An amount of the polysaccharide derivative carried on a carrier is preferably 1 to 100 parts by mass, more preferably 5 to 60 parts by mass, and particularly preferably 10 to 40 parts by mass with respect to 100 parts by mass of the separating agent for enantiomeric isomers.

For pulverization or formation of spherical particles of the polysaccharide derivative itself, the obtained pulverized or spherical polysaccharide derivative is desirably classified by using a mortar or the like to have a similar particle size.

The separating agent for enantiomeric isomers of the present invention can be used as a stationary phase for chromatography. The separating agent for enantiomeric isomers of the present invention can be used for gas chromatography, liquid chromatography, thin-layer chromatography, electrophoresis, and the like. In particular, the separating agent for enantiomeric isomers of the present invention is preferably used for (continuous) liquid chromatography, thin-layer chromatography, and electrophoresis. The separating agent for enantiomeric isomers of the present invention may be not only used as a separating agent for chromatography, but also applied as a host/guest separating agent, and for membrane separation and liquid crystal materials.

The separating agent for enantiomeric isomers of the present invention, a stationary phase for chromatography using the same, and a stationary phase for continuous liquid chromatography using the same are suitable for enantiomeric isomers analysis technique involving the optical separation of a wide range of chiral compounds at high separation factors in the analysis of drugs, food products, agricultural chemicals, and fragrance materials.

The separating agent for enantiomeric isomers of the present invention has excellent optical resolving power.

EXAMPLES

The present invention will be described in more detail by way of examples, but the present invention is not limited to the examples. Note that, a retention factor (k') and a separation factor (α) in the examples are defined by the following equations.

Retention Factor (K')

k'=[(Retention time of racemic modification)−(Dead time)]/Dead time (Dead time represents an elution time of Tri-tert-butylbenzene.)

Separation Factor (α)

α=(Retention factor of enantiomeric isomer retained more strongly)/(Retention factor of enantiomeric isomer retained more weakly)

Synthesis Example 1

Synthesis of Benzoyl Isocyanate (1)

Benzamide and oxalyl chloride were stirred in dimethylsulfoxide (DMSO) in a nitrogen atmosphere at 60° C. for 6 hours, to thereby synthesize benzoyl isocyanate. The obtained benzoyl isocyanate was purified through distillation under reduced pressure (61° C./4 mmHg).

Synthesis Example 2

Synthesis of 4-Methylbenzoyl Isocyanate (2)

p-Toluamide and oxalyl chloride were stirred in dimethylsulfoxide (DMSO) in a nitrogen atmosphere at 60° C. for 6 hours, to thereby synthesize 4-methylbenzoyl isocyanate. The obtained 4-methylbenzoyl isocyanate was purified through distillation under reduced pressure (86° C./4 mmHg).

Synthesis Example 3

Synthesis of 4-Chlorobenzoyl Isocyanate (3)

4-Chlorobenzamide and oxalyl chloride were stirred in dimethylsulfoxide (DMSO) in a nitrogen atmosphere at 60° C. for 6 hours, to thereby synthesize 4-chlorobenzoyl isocyanate. The obtained 4-chlorobenzoyl isocyanate was purified through distillation under reduced pressure (93° C./6 mmHg).

Synthesis Example 4

Synthesis of 3,5-Dimethylbenzoyl Chloride (4)

Thionyl chloride was gradually added to 3,5-dimethylbenzoic acid in a nitrogen atmosphere while the whole was cooled in an ice bath. After the addition was completed, the whole was heated to 80° C. for a reaction, to thereby synthesize 3,5-dimethylbenzoyl chloride.

Synthesis Example 5

Synthesis of 3,5-dimethylbenzamide (5)

3,5-Dimethylbenzoyl chloride and ammonium carbonate were stirred in diethyl ether in a nitrogen atmosphere at room temperature for 4 hours, to thereby synthesize 3,5-dimethylbenzamide.

Synthesis Example 6

Synthesis of 3,5-Dimethylbenzoyl Isocyanate (6)

3,5-Dimethylbenzoyl chloride and oxalyl chloride were stirred in dimethylsulfoxide (DMSO) in a nitrogen atmosphere at 60° C. for 6 hours, to thereby synthesize 3,5-dimethylbenzoyl isocyanate. The obtained 3,5-dimethylbenzoyl isocyanate was purified through distillation under reduced pressure (104° C./8 mmHg).

Examples 1 to 7

(a) Production of Polysaccharide Benzoyl Carbamate Derivatives (7) to (13)

In a nitrogen atmosphere, 20 ml of pyridine or dimethylsulfoxide was added to 1 g of a polysaccharide (cellulose or amylose), and each of the corresponding isocyanates (1) to (3) and (6) was added thereto in an amount of 1.5 equivalents to that of hydroxyl groups of the polysaccharide, and stirred under heating to thereby obtain each of polysaccharide benzoyl carbamate derivatives (7) to (13) shown in Table 1.

TABLE 1

| | | Polysaccharide benzoyl carbamate derivative | | | | | | | | |
|---|---|---|---|---|---|---|---|---|---|---|
| | | | | | | C (%) | | H (%) | | N (%) | |
| Ex. | Type of isocyanate | Polysaccharide (g) | Type | Yield (g) | Yield (%) | Analytical value | Calculated value | Analytical value | Calculated value | Analytical value | Calculated value |
| 1 | 4-Methyl-benzoyl isocyanate (2) | Cellulose (0.40) | Cellulose tris(4-methyl-benzoyl carbamate)(7) | 1.37 | 86 | 58.61 | 61.39 | 5.18 | 4.80 | 5.98 | 6.51 |
| 2 | 4-Chloro-benzoyl isocyanate (3) | Cellulose (0.30) | Cellulose tris(4-chloro-benzoyl carbamate)(8) | 1.09 | 83 | 48.09 | 50.97 | 3.41 | 3.14 | 6.12 | 5.94 |
| 3 | 3,5-Dimethyl benzoyl isocyanate (6) | Cellulose (0.10) | Cellulose tris(3,5-di-methylbenzoyl carbamate)(9) | 0.31 | 74 | 62.84 | 62.87 | 5.54 | 5.42 | 4.22 | 6.11 |
| 4 | Benzoyl isocyanate (1) | Amylose (0.13) | Amylose tris(benzoyl carbamate)(10) | 0.39 | 79 | 57.09 | 59.70 | 4.46 | 4.14 | 6.78 | 6.96 |
| 5 | 4-Methyl-benzoyl isocyanate (2) | Amylose (0.40) | Amylose tris(4-methyl-benzoyl carbamate)(11) | 1.42 | 90 | 59.23 | 61.39 | 5.11 | 4.80 | 6.32 | 6.51 |
| 6 | 4-Chloro-benzoyl isocyanate (3) | Amylose (0.30) | Amylose tris(4-chloro-benzoyl carbamate)(12) | 1.14 | 87 | 48.65 | 50.97 | 3.29 | 3.14 | 6.18 | 5.94 |
| 7 | 3,5-Dimethyl benzoyl isocyanate (6) | Amylose (0.10) | Amylose tris(3,5-di-methylbenzoyl carbamate)(13) | 0.30 | 73 | 62.60 | 62.87 | 5.50 | 5.42 | 4.26 | 6.11 |

(b) Surface Treatment of Silica Gel

Porous silica gel (particle size of 7 μm) was reacted with 3-aminopropyl triethoxysilane for aminopropylsilane (APS) treatment.

(c) Preparation of Filler for Liquid Chromatography 0.225 g of each of the polysaccharide benzoyl carbamate derivatives (7) to (13) obtained in the above section (a) was dissolved in tetrahydrofuran (THF) or dimethylsulfoxide (DMSO), and 0.9 g of silica gel obtained in the above section (b) was evenly coated with the resulting solution. Then, the solvent was distilled off under reduced pressure, to thereby obtain a filler for enantiomeric isomers having the target polysaccharide derivative carried on silica gel.

(d) Preparation of Column for Liquid Chromatography

The filler obtained in the above section (c) was pressed and filled into a stainless column of 0.2 cmΦ×25 cmL through a slurry filling method, to thereby prepare an enantiomeric isomer separation column.

Application Example 1

The enantiomeric isomer separation columns prepared in Examples were each evaluated for asymmetry identifying power (retention factor k' value and separation factor α value) by using the following ten compounds by means of liquid chromatography. Table 2 shows the results.

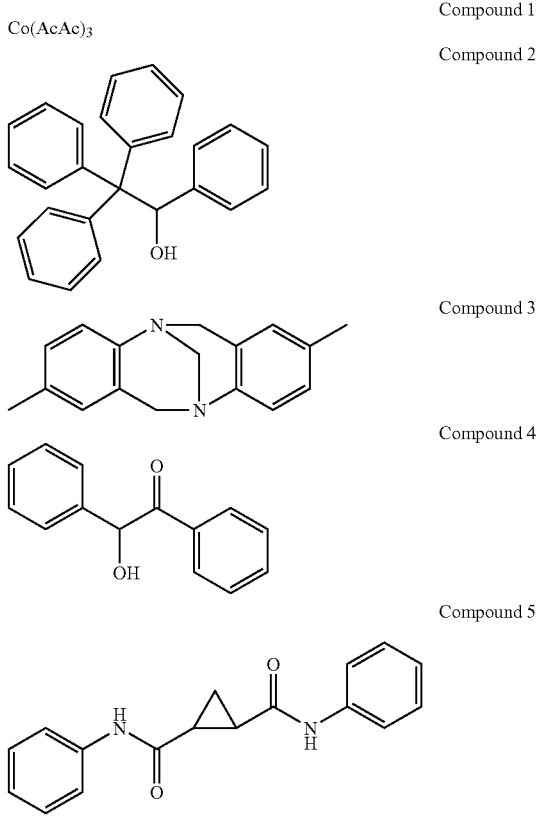

-continued

Compound 6
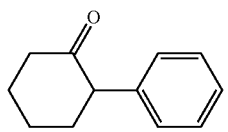

Compound 7
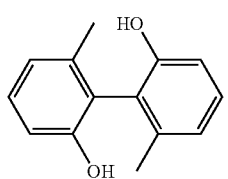

Compound 8
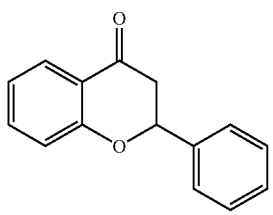

Compound 9
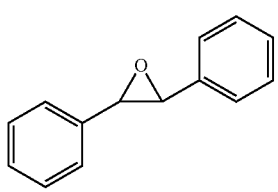

Compound 10
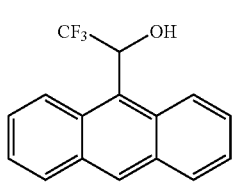

least part of hydrogen atoms of hydroxyl groups of a polysaccharide substituted by an atomic group represented by one of the following general formulae (I) and (IV)-(VII):

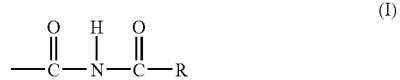 (I)

wherein R in general formula (I) represents an atomic group represented by one of the following general formulae (VIII)-(X):

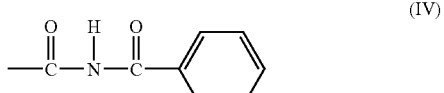 (IV)

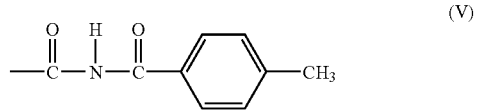 (V)

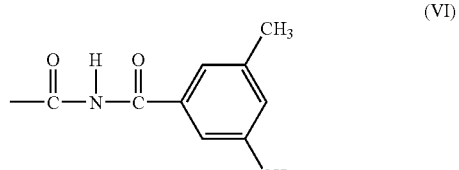 (VI)

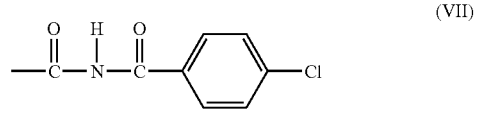 (VII)

TABLE 2

|  |  | Ex. 1 | | Ex. 2 | | Ex. 3 | | Ex. 4 | | Ex. 5 | | Ex. 6 | | Ex. 7 | |
| --- | --- | --- | --- | --- | --- | --- | --- | --- | --- | --- | --- | --- | --- | --- | --- |
|  | Polysaccharide derivative | k1' Synthesis Ex. 1 | α | k1' Synthesis Ex. 2 | α | k1' Synthesis Ex. 3 | α | k1' Synthesis Ex. 4 | α | k1' Synthesis Ex. 5 | α | k1' Synthesis Ex. 6 | α | k1' Synthesis Ex. 7 | α |
| Racemic modification | Compound 1 | 0.30 | 1* | 0.12 | 1* | 0.48 | 1* | 0.63 | 1.00 | 0.41 | 1* | 0.49 | 1* | 0.29 | 1* |
|  | Compound 2 | 0.53 | 1* | 0.17 | 1* | 1.25 | 1* | 0.66 | 1.00 | 0.68 | 1.00 | 0.47 | 1* | 0.58 | 1* |
|  | Compound 3 | 0.29 | 1.00 | 0.11 | 1* | 0.79 | 1* | 0.52 | 1* | 0.45 | 1* | 0.48 | 1* | 0.50 | 1* |
|  | Compound 4 | 1.84 | 1.13 | 0.67 | 1* | 3.89 | 1.08 | 2.82 | 1.09 | 2.60 | 1.14 | 2.38 | 1.11 | 1.72 | 1.23 |
|  | Compound 5 | 1.12 | 1.43 | 0.36 | 1* | 2.19 | 1.81 | 1.96 | 1.34 | 2.02 | 1.14 | 1.41 | 1.60 | 1.36 | 1* |
|  | Compound 6 | 0.55 | 1* | 0.20 | 1* | 1.33 | 1.10 | 0.79 | 1* | 0.59 | 1* | 0.61 | 1* | 0.58 | 1.24 |
|  | Compound 7 | 1.56 | 1.09 | 0.54 | 1* | 2.01 | 1.27 | 1.39 | 1.16 | 1.42 | 1* | 1.07 | 1.20 | 0.49 | 1* |
|  | Compound 8 | 0.64 | 1* | 0.16 | 1.00 | 1.80 | 1.00 | 0.98 | 1* | 0.84 | 1.00 | 0.88 | 1.00 | 1.02 | 1.00 |
|  | Compound 9 | 0.66 | 1* | 0.07 | 1* | 0.63 | 1* | 0.28 | 1* | 0.27 | 1* | 0.26 | 1* | 0.32 | 1.17 |
|  | Compound 10 | 2.02 | 1.18 | 0.36 | 1.00 | 4.81 | 1.08 | 1.68 | 1.00 | 2.41 | 1.03 | 0.80 | 1.00 | 2.03 | 1.00 |

Note:
1* means approximately 1.

(Analysis Conditions)
Mobile phase: hexane/2-propanol=90/10 (v/v)
Flow rate: 0.1 ml/min
Detection: 254 nm
Temperature: 25° C.

The invention claimed is:
1. A separating agent for enantiomeric isomers comprising, as an active ingredient, a polysaccharide derivative having at

-continued

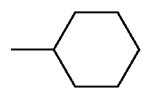 (VIII)

-continued

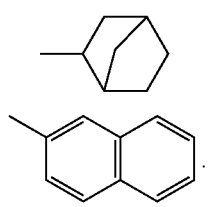
(IX)

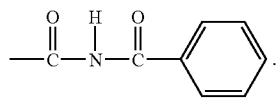
(X)

2. The separating agent for enantiomeric isomers according to claim 1, wherein the polysaccharide comprises cellulose or amylose.

3. The separating agent for enantiomeric isomers according to claim 1, wherein the atomic group consists of an atomic group represented by the following formula (IV)

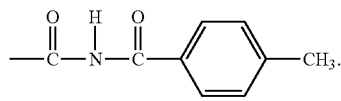
(IV)

4. The separating agent for enantiomeric isomers according to claim 1, wherein the atomic group consists of an atomic group represented by the following formula (V)

(V)

5. The separating agent for enantiomeric isomers according to claim 1, wherein the atomic group consists of an atomic group represented by the following formula (VI)

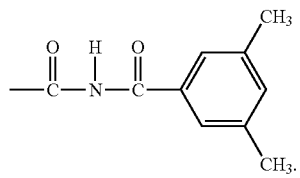
(VI)

6. The separating agent for enantiomeric isomers according to claim 1, wherein the atomic group consists of an atomic group represented by the following formula (VII)

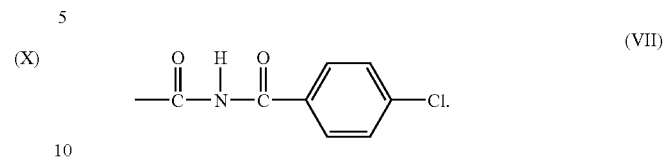
(VII)

7. The separating agent for enantiomeric isomers according to claim 1, wherein R in general formula (I) represents an atomic group represented by the following formula (VIII)

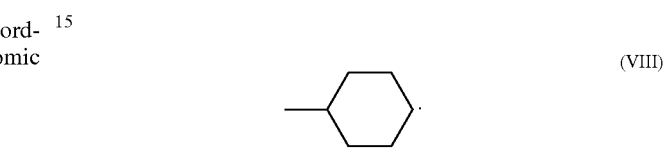
(VIII)

8. The separating agent for enantiomeric isomers according to claim 1, wherein R in general formula (I) represents an atomic group represented by the following formula (IX)

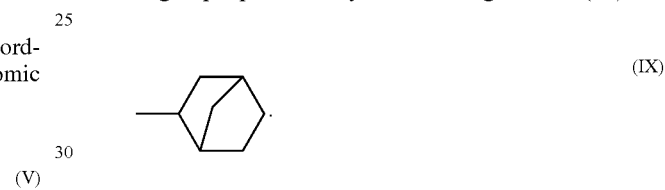
(IX)

9. The separating agent for enantiomeric isomers according to claim 1, wherein R in general formula (I) represents an atomic group represented by the following formula (X)

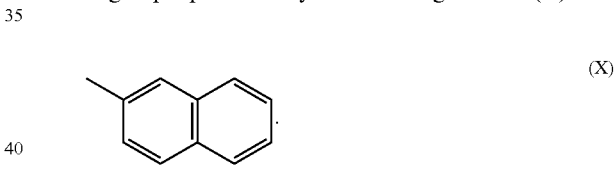
(X)

10. The separating agent for enantiomeric isomers according to claim 1, which is used as a stationary phase for chromatography.

11. The separating agent for enantiomeric isomers according to claim 1, which is used as a stationary phase for continuous liquid chromatography.

* * * * *